United States Patent
Sekiguchi et al.

(10) Patent No.: US 10,720,622 B2
(45) Date of Patent: Jul. 21, 2020

(54) MICROPOROUS MEMBRANE, BATTERY SEPARATOR, AND BATTERY

(71) Applicant: Asahi Kasei Kabushiki Kaisha, Tokyo (JP)

(72) Inventors: Manabu Sekiguchi, Tokyo (JP); Yuki Fukunaga, Tokyo (JP); Keita Dohki, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 15/744,365

(22) PCT Filed: Jul. 13, 2016

(86) PCT No.: PCT/JP2016/070743
§ 371 (c)(1),
(2) Date: Jan. 12, 2018

(87) PCT Pub. No.: WO2017/010528
PCT Pub. Date: Jan. 19, 2017

(65) Prior Publication Data
US 2018/0205057 A1    Jul. 19, 2018

(30) Foreign Application Priority Data
Jul. 14, 2015    (JP) .................. 2015-140389

(51) Int. Cl.
*H01M 2/16*    (2006.01)
*C08L 23/08*    (2006.01)
(Continued)

(52) U.S. Cl.
CPC ............ *H01M 2/1653* (2013.01); *C08J 9/26* (2013.01); *C08L 23/06* (2013.01); *C08L 23/08* (2013.01);
(Continued)

(58) Field of Classification Search
CPC ... H01M 2/1653; H01M 2/16; C08L 23/0815; C08L 23/06; C08L 23/12; C08L 23/08;
(Continued)

(56) References Cited

U.S. PATENT DOCUMENTS 9,362,539 B2 * 6/2016 Kamo .................. H01M 2/162
2006/0177643 A1 * 8/2006 Kondo ............... B01D 67/0018
428/304.4

(Continued)

FOREIGN PATENT DOCUMENTS

JP    2003-012850 A    1/2003
JP    2005-225919 A    8/2005
(Continued)

OTHER PUBLICATIONS

Machine translation of JP 5188970, 2013 (Year: 2013).*
(Continued)

*Primary Examiner* — Robert S Carrico
*Assistant Examiner* — Kwang Han
(74) *Attorney, Agent, or Firm* — Morgan, Lewis & Bockius LLP (57) ABSTRACT

A microporous membrane according to the present invention is a microporous membrane containing a copolymerized high density polyethylene and a high density polyethylene, wherein a content of an α-olefin unit having 3 or more carbon atoms in the microporous membrane is 0.01 mol % or more and 0.6 mol % or less, and a viscosity average molecular weight of the microporous membrane is less than 300,000. In addition, a battery separator according to the present invention contains the above microporous membrane. Further, a battery according to the present invention contains the above battery separator.

18 Claims, 3 Drawing Sheets

(51) Int. Cl.
 C08L 23/12 (2006.01)
 C08L 23/06 (2006.01)
 C08J 9/26 (2006.01)

(52) U.S. Cl.
 CPC ........... C08L 23/0815 (2013.01); C08L 23/12 (2013.01); H01M 2/16 (2013.01); *C08L 2203/20* (2013.01); *C08L 2205/02* (2013.01); *C08L 2207/062* (2013.01)

(58) Field of Classification Search
 CPC ............. C08L 2203/20; C08L 2205/02; C08L 2207/062; C08J 9/26
 See application file for complete search history.

(56) References Cited

U.S. PATENT DOCUMENTS

| | | | |
|---|---|---|---|
| 2008/0269366 A1 | 10/2008 | Shaffer et al. | |
| 2010/0129720 A1* | 5/2010 | Sako .................. | H01M 2/1653 429/246 |
| 2015/0065595 A1* | 3/2015 | Nasu ..................... | C08F 110/02 521/134 |

FOREIGN PATENT DOCUMENTS

| | | | | |
|---|---|---|---|---|
| JP | 4884008 B | | 2/2012 | |
| JP | 5188970 | * | 4/2013 | ........... H01M 2/145 |
| WO | 2004/085525 A1 | | 10/2004 | |
| WO | 2008/013114 A1 | | 1/2008 | |

OTHER PUBLICATIONS

Supplementary European Search Report issued in corresponding European Patent Application No. 16824508.2 dated May 4, 2018.
International Search Report issued in corresponding International Patent Application No. PCT/JP2016/070743 dated Aug. 16, 2016.
International Preliminary Report on Patentability and Written Opinion issued in corresponding International Patent Application No. PCT/JP2016/070743 dated Jan. 16, 2018.

* cited by examiner

MICROPOROUS MEMBRANE, BATTERY SEPARATOR, AND BATTERY

TECHNICAL FIELD

The present invention relates to a microporous membrane, a battery separator, and a battery.

BACKGROUND ART

Microporous membranes using polyolefins as raw materials are widely used as separation membranes, permselective separation membranes, separation materials, and the like for various substances. Examples of their applications include microfiltration membranes, fuel cell separators, capacitor separators, the base materials of functional membranes in which pores are filled with a functional material to exhibit a new function, and battery separators. Among them, as separators for lithium ion batteries widely provided in notebook personal computers, cellular phones, and digital cameras and for in-vehicle use and the like, polyolefin microporous membranes are preferably used.

In recent years, the performance enhancement of these electronic apparatuses has also been significant, and with this, particularly the demand for higher capacity of batteries has increased rapidly. Under the circumstances, excellent permeability and further improvement of the fuse effect are required of lithium ion battery separators. The fuse effect is a mechanism in which when overheating occurs inside a battery due to an overcharged state or the like, the separator melts and forms a film covering the electrode to interrupt the current, thereby ensuring the safety of the battery. In the case of a polyethylene microporous membrane, the fuse temperature, that is, the temperature at which the fuse effect is exhibited, is known to be roughly around 140° C., but from the viewpoint of stopping a runaway reaction or the like inside a battery as quickly as possible, lower fuse temperature is considered to be better.

Therefore, Patent Literature 1 proposes a polyethylene microporous membrane excellent in mechanical strength and permeability and having low fuse temperature and high heat resistance.

CITATION LIST

Patent Literature

Patent Literature 1
  Japanese Patent No. 4884008

SUMMARY OF INVENTION

Technical Problem

However, in recent years, with larger size and higher capacity of batteries, in order to ensure the safety of a larger-sized battery, it is necessary to interrupt the current in a short time when fuse temperature is reached. In addition, in a larger-sized battery, in a battery winding step, the contact area between a pin and a separator increases, and a problem in terms of the so-called pin removability in which the winding of a wound body is displaced when the pin is removed from the wound body occurs. Therefore, a reduction in separator friction is necessary.

In a larger-sized battery, Joule heat that is generated when an overcharged state is reached inside the battery increases, and it is exponentially difficult to obtain safety test results at the same level as those of conventional ones. For example, with higher capacity, heat is easily generated to the set temperature or more inside the battery, and when the thermal runaway of the battery starts, there is a possibility that the safety of the battery cannot be ensured.

In Patent Literature 1, attention is paid to excellent mechanical strength and permeability and low fuse temperature and high heat resistance, but problems remain regarding current interruption speed when fuse temperature is reached, and pin removability in a battery winding step.

The present invention has been made in view of the above circumstances, and it is an object of the present invention to provide a microporous membrane excellent in both the safety and productivity of a battery, a battery separator, and a battery.

Solution to Problem

The present inventors have studied diligently over and over in order to achieve the above-described object, and as a result, found that by providing a microporous membrane comprising particular components, a current can be interrupted in a short time when fuse temperature is reached, and the frictional resistance is reduced.

Specifically, the present invention is as follows.

[1]
A microporous membrane comprising a copolymerized high density polyethylene and a high density polyethylene, wherein
a content of an α-olefin unit having 3 or more carbon atoms in the microporous membrane is 0.01 mol % or more and 0.6 mol % or less, and
a viscosity average molecular weight of the microporous membrane is less than 300,000.

[2]
The microporous membrane according to [1], wherein a molecular weight distribution Mw/Mn of the microporous membrane is 2 or more and 8 or less.

[3]
The microporous membrane according to [1] or [2], wherein the copolymerized high density polyethylene has an MI of 0.1 to 5, and a content of the α-olefin unit having 3 or more carbon atoms in the copolymerized high density polyethylene is 0.1 to 1 mol %, and
the high density polyethylene has a viscosity average molecular weight of 100,000 or more and less than 500,000.

[4]
The microporous membrane according to any of [1] to [3], wherein the microporous membrane does not comprise a high density polyethylene having a viscosity average molecular weight of 500,000 or more.

[5]
The microporous membrane according to any of [1] to [4], further comprising polypropylene.

[6]
The microporous membrane according to any of [1] to [5], wherein a dynamic friction coefficient of the microporous membrane is less than 0.2.

[7]
A battery separator comprising the microporous membrane according to any of [1] to [6].

[8]
A battery comprising the battery separator according to [7].

Advantageous Effects of Invention

The microporous membrane of the present invention is excellent in both the safety and productivity of a battery.

BRIEF DESCRIPTION OF DRAWINGS

FIGS. 2(A) to 2(C) are diagrams showing a measuring apparatus for fuse temperature, fuse response time and membrane breakage (short) temperature.

DESCRIPTION OF EMBODIMENT

A mode for carrying out the present invention (hereinafter sometimes abbreviated as "the present embodiment") will be described in detail below. The present invention is not limited to the present embodiment below, and various modifications can be made without departing from the spirit thereof.

A microporous membrane in the present embodiment is a microporous membrane comprising a copolymerized high density polyethylene and a high density polyethylene, wherein the content of an α-olefin unit having 3 or more carbon atoms in the above microporous membrane is 0.01 mol % or more and 0.6 mol % or less, and the viscosity average molecular weight of the above microporous membrane is less than 300,000. The microporous membrane in the present embodiment is configured in this manner and therefore is excellent in both the safety and productivity of a battery. In other words, the microporous membrane in the present embodiment can interrupt a current in a short time when fuse temperature is reached (has a short fuse response time), and therefore is excellent in the safety of a battery. In addition, in the microporous membrane in the present embodiment, friction is sufficiently reduced, and therefore the winding displacement of a wound body when a pin is removed from the wound body in a battery winding step can be prevented, and the productivity of a battery (pin removability after battery winding) is excellent.

The microporous membrane in the present embodiment is preferably a microporous membrane obtained from a polyolefin mixture comprising a copolymerized high density polyethylene and a high density polyethylene (hereinafter also simply referred to as a "mixture").

(Copolymerized High Density Polyethylene)

The copolymerized high density polyethylene is a polyethylene obtained by the copolymerization of ethylene and another monomer and has high density.

The melt index (MI) of the copolymerized high density polyethylene is preferably 0.1 to 5, more preferably 0.5 to 3, from the viewpoint of fluidity during a shutdown, shrinkage force relaxation properties, and formability. The MI in the present embodiment is a value measured at a temperature of 190° C. and under a load of 2.16 kg in accordance with JIS K7210. The viscosity average molecular weight (Mv) of copolymerized high density polyethylene is not particularly limited but is preferably 10,000 to 250,000. Mv can be measured by a method described in Examples described later.

The comonomer of the copolymerized high density polyethylene is preferably an α-olefin having 3 or more carbon atoms (hereinafter also simply referred to as a "comonomer"). Examples thereof include, but are not limited to, propylene, butene, pentene, hexene, heptene, and octene. Among them, propylene having 3 carbon atoms is more preferred from the viewpoint of affinity for another polyethylene. The content of the α-olefin unit having 3 or more carbon atoms is 0.1 mol % or more, preferably 0.1 to 1 mol %, and more preferably 0.2 to 0.8 mol %, based on the ethylene unit of the copolymerized high density polyethylene. When the content of the α-olefin unit having 3 or more carbon atoms is 0.1 mol % or more, the effect of a lower melting point tends to be sufficiently obtained. When the content of the α-olefin unit having 3 or more carbon atoms is 1 mol % or less, a sufficient degree of crystallinity can be ensured, and sufficient permeability of the microporous membrane can be ensured, and at the same time the friction coefficient can be reduced, and therefore the pin removability tends to become good. The above content can be obtained by a method described in Examples described later.

The density of the copolymerized high density polyethylene is related to the content of the α-olefin unit having 3 or more carbon atoms, and high density is necessary from the viewpoint of a melting point and permeability. The "high density" (unit: g/cm$^3$) here is 0.93 to 0.97, preferably 0.94 to 0.96. In the present embodiment, the density of polyethylene refers to a value measured according to D) density gradient tube method described in JIS K7112 (1999).

The copolymerized high density polyethylene used in the present embodiment can be produced by various known methods, and although not limited to the following, for example, the copolymerized high density polyethylene can be produced by polymerization using a chromium compound-supported catalyst and a magnesium compound-containing Ziegler catalyst as disclosed in Japanese Patent Publication No. 1-12777 or a metallocene catalyst.

(High Density Polyethylene)

In the present embodiment, the high density polyethylene is polyethylene having a comonomer unit content of less than 0.1%, and homopolyethylene in which no comonomer is contained is preferred. The "high density" here has the same definition as the "high density" for the above copolymerized high density polyethylene.

The Mv of the high density polyethylene is preferably 100,000 or more and less than 500,000, the above polyethylene having an Mv of 150,000 or more and less than 350,000 is more preferred, and several types of polyethylene may be blended. When the Mv of the high density polyethylene is 100,000 or more, sufficient mechanical strength tends to be ensured. When the Mv of the high density polyethylene is less than 500,000, the time required to interrupt a current when fuse temperature is reached tends to be sufficiently short.

(Composition of Mixture)

The proportion of the copolymerized high density polyethylene in the above mixture is preferably 10 to 90% by mass, more preferably 25 to 80% by mass, and further preferably 30 to 70% by mass from the viewpoint of fuse characteristics and permeability. When the proportion of the copolymerized high density polyethylene is 10% by mass or more, the fuse temperature tends to be sufficiently low.

When the proportion of the copolymerized high density polyethylene is 90% by mass or less, sufficient heat resistance tends to be obtained.

The proportion of the high density polyethylene in the above mixture is preferably 10 to 90% by mass, more preferably 20 to 80% by mass, and further preferably 30 to 70% by mass. When the proportion of the high density polyethylene is 10% by mass or more, sufficient heat resistance tends to be obtained. When the proportion of the high density polyethylene is 90% by mass or less, the fuse response time tends to be sufficiently short.

The microporous membrane in the present embodiment preferably does not comprise a high density polyethylene having a viscosity average molecular weight of 500,000 or more. In other words, the above mixture preferably does not comprise a high density polyethylene having a viscosity average molecular weight of 500,000 or more. By forming a mixture not comprising a high density polyethylene having a viscosity average molecular weight of 500,000 or more, the widening of the molecular weight distribution tends to be able to be prevented, and an increase in fuse response time due to a rise in melt viscosity and an increase in fraction defective (defects) tend to be able to be prevented.

The microporous membrane in the present embodiment preferably further comprises polypropylene from the viewpoint of improving heat resistance. In other words, polypropylene is preferably further contained in the above mixture. In this case, the proportion of the polypropylene based on the total amount of the mixture and the polypropylene is preferably 1 to 35% by mass, more preferably 3 to 20% by mass, and further preferably 4 to 10% by mass from the viewpoint of achieving both heat resistance and a good shutdown function.

Optional additives can be contained in the mixture in the present embodiment. Examples of the additives include polymers other than polyolefin resins; inorganic fillers; antioxidants such as phenolic, phosphorus-based, and sulfur-based antioxidants; metallic soaps such as calcium stearate and zinc stearate; ultraviolet absorbing agents; light stabilizers; antistatic agents; antifogging agents; and coloring pigments. The total amount of these additives added is preferably 20 parts by mass or less based on 100 parts by mass of the total of the copolymerized high density polyethylene and the high density polyethylene in the mixture from the viewpoint of improving shutdown performance and the like, and is more preferably 10 parts by mass or less and further preferably 5 parts by mass or less.

As described above, in the present embodiment, it is preferred that the above copolymerized high density polyethylene has an MI of 0.1 to 5, and the content of the α-olefin unit having 3 or more carbon atoms in the above copolymerized high density polyethylene is 0.1 to 1 mol %, and further the above high density polyethylene has a viscosity average molecular weight of 100,000 or more and less than 500,000. In other words, the microporous membrane in the present embodiment is preferably obtained from a mixture comprising a copolymerized high density polyethylene which has an MI of 0.1 to 5 and in which the content of an α-olefin unit having 3 or more carbon atoms is 0.1 to 1 mol % and a high density polyethylene having a viscosity average molecular weight of 100,000 or more and less than 500,000. In other words, the microporous membrane in the present embodiment preferably comprises a mixture comprising a copolymerized high density polyethylene which has an MI of 0.1 to 5 and in which the content of an α-olefin unit having 3 or more carbon atoms is 0.1 to 1 mol % and a high density polyethylene having a viscosity average molecular weight of 100,000 or more and less than 500,000.

The reason why the microporous membrane obtained from the mixture having the composition as described above especially has a fast reaction rate when fuse temperature is reached (short fuse response time) and low frictional resistance (small dynamic friction coefficient) is not certain, but it is considered that by mixing a copolymerized high density polyethylene having a relatively low molecular weight and a high density polyethylene having a relatively low molecular weight, the melt characteristics of the resins improve, and the reaction rate when fuse temperature is reached becomes fast, and because of low crystalline melting points, the crystallinity increases, and the frictional resistance can be lowered. The above action mechanisms are not limited, and as long as the microporous membrane satisfies the above-described configuration, the desired effects in the present embodiment can be obtained.

(Microporous Membrane)

The viscosity average molecular weight of the microporous membrane in the present embodiment is less than 300,000, preferably 50,000 or more and less than 300,000, and more preferably 150,000 or more and less than 300,000. When the viscosity average molecular weight is less than 300,000, uniform melting and kneading is easy, and the formability, particularly thickness stability, of a sheet is excellent. Further, when a battery separator is formed, the pores are easily clogged during temperature rise and a better shutdown function is obtained when the viscosity average molecular weight is less than 300,000. Further, it is preferred that the viscosity average molecular weight is 50,000 or more because the melt tension in melting and forming increases, and the formability tends to become good, and at the same time the strength tends to be high due to the entanglement of the polymers. The viscosity average molecular weight of the microporous membrane can be measured by a method described later.

The molecular weight distribution Mw/Mn of the microporous membrane in the present embodiment is 1 or more and 10 or less, preferably 2 or more and 9 or less, and more preferably 2 or more and 8 or less. It is preferred that the molecular weight distribution Mw/Mn is 8 or less because the strength tends to be high at a high speed tensile strength that is important in an impact test that is a test for the safety of a battery. It is preferred that the molecular weight distribution Mw/Mn is 2 or more because the melting and kneading properties improve. The molecular weight distribution Mw/Mn of the microporous membrane can be measured by a method described in Examples described later.

The content of the α-olefin unit having 3 or more carbon atoms in the microporous membrane in the present embodiment is 0.01 mol % or more and 0.6 mol % or less, preferably 0.05 to 0.6 mol %, and more preferably 0.1 to 0.5 mol %. The content of the α-olefin unit having 3 or more carbon atoms is 0.01 mol % or more from the viewpoint of fuse temperature and fuse response time and 0.6 mol % or less from the viewpoint of permeability, a dynamic friction coefficient, and membrane breakage temperature. The above content can be obtained by a method described in Examples described later.

The microporous membrane according to the present embodiment has a porous structure in which a large number of very fine pores gather to form dense communicating pores, and therefore is characterized by being very excellent in ionic conductivity and at the same time also having good withstand voltage characteristics and moreover having high strength. The microporous membrane may be a single-layer membrane comprising the above-described materials or a laminated membrane.

The membrane thickness of the microporous membrane according to the present embodiment is preferably 0.1 μm or more and 100 μm or less, more preferably 1 μm or more and 50 μm or less, and further preferably 3 μm or more and 25 μm or less. The membrane thickness of the microporous membrane is preferably 0.1 μm or more from the viewpoint of mechanical strength and preferably 100 μm or less from the viewpoint of higher capacity of a battery. The membrane thickness of the microporous membrane can be adjusted by controlling the die lip gap, the drawing magnification in the stretching step, or the like. The above membrane thickness can be measured by a method described in Examples described later.

The porosity of the microporous membrane according to the present embodiment is preferably 25% or more and 95% or less, more preferably 30% or more and 65% or less, and further preferably 35% or more and 55% or less. The porosity of the microporous membrane is preferably 25% or more from the viewpoint of ionic conductivity improvement and preferably 95% or less from the viewpoint of withstand voltage characteristics. The porosity of the microporous membrane can be adjusted by controlling the mixing ratio between the polyolefin resin composition and the plasticizer, the stretching temperature, the drawing magnification, the heat setting temperature, the drawing magnification during heat setting, or the relaxation rate during heat setting, or combining these. The above porosity can be measured by a method described in Examples described later.

The air permeability of the microporous membrane according to the present embodiment is preferably 100 to 600 seconds, more preferably 120 to 550 seconds, and further preferably 150 to 500 seconds. When the air permeability is 600 seconds or less, sufficient permeability tends to be ensured. When the air permeability is 100 seconds or more, an excessively large pore diameter tends to be able to be prevented. The air permeability of the microporous membrane can be adjusted by controlling the mixing ratio between the polyolefin resin composition and the plasticizer, the stretching temperature, the drawing magnification, the heat setting temperature, the drawing magnification during heat setting, or the relaxation rate during heat setting, or combining these. The above air permeability can be measured by a method described in Examples described later.

The puncture strength of the microporous membrane according to the present embodiment is preferably 1 to 20 N/20 μm, further preferably 2 to 18 N/20 μm, from the viewpoint of breaking resistance during battery winding, and battery defects due to a short circuit between electrodes. The puncture strength of the microporous membrane can be adjusted by controlling the mixing ratio between the polyolefin resin composition and the plasticizer, the stretching temperature, the drawing magnification, the heat setting temperature, the drawing magnification during heat setting, or the relaxation rate during heat setting, or combining these. The above puncture strength can be measured by a method described in Examples described later.

The fuse temperature of the microporous membrane according to the present embodiment is preferably 140° C. or less, more preferably 138° C. or less, and further preferably 137° C. or less from the viewpoint of sufficiently exhibiting the effect of interrupting a current when a battery is heated in an overcharge test or the like. When the fuse temperature is 140° C. or less, for example, the occurrence of delay in current interruption by a shutdown and the heat generation of a battery in an overcharge test or the like tend to be prevented. The fuse temperature of the microporous membrane can be adjusted by controlling the mixing ratio between the copolymerized high density polyethylene and the high density polyethylene, the stretching temperature, the drawing magnification, the heat setting temperature, the drawing magnification during heat setting, or the relaxation rate during heat setting, or combining these. The above fuse temperature can be measured by a method described in Examples described later.

The membrane breakage temperature of the microporous membrane according to the present embodiment is preferably 150° C. or more, more preferably 155° C. or more. When the membrane breakage temperature is 150° C. or more, the membrane breakage of a separator in a 150° C. battery oven test or the like tends to be prevented. The membrane breakage temperature of the microporous membrane can be adjusted by controlling the mixing ratio between the copolymerized high density polyethylene and the high density polyethylene, the stretching temperature, the drawing magnification, the heat setting temperature, the drawing magnification during heat setting, or the relaxation rate during heat setting, or combining these. The above membrane breakage temperature can be measured by a method described in Examples described later.

The microporous membrane according to the present embodiment is excellent in pin removability after battery winding. In a battery winding step, the winding of a battery is performed by winding a positive electrode, a separator, and a negative electrode around a pin, and then the above pin is removed from the wound body, but a problem is that the winding displacement of the wound body occurs. As described above, the microporous membrane according to the present embodiment is excellent in pin removability after battery winding, and for the reason, it is considered that the dynamic friction coefficient of the microporous membrane is related. The dynamic friction coefficient of the microporous membrane can be adjusted by controlling the mixing ratio between the copolymerized high density polyethylene and the high density polyethylene, the stretching temperature, the drawing magnification, the heat setting temperature, the drawing magnification during heat setting, or the relaxation rate during heat setting, or combining these. The pin removability after battery winding can be evaluated by a method described later.

The dynamic friction coefficient of the microporous membrane according to the present embodiment is preferably 0.2 or less, more preferably 0.18 or less. When the dynamic friction coefficient is 0.2 or less, the battery winding performance tends to become good, which is preferred. The dynamic friction coefficient can be measured by a method shown in Examples described later.

(Production Method)

The method for producing the microporous membrane is not particularly limited, and a known production method can be adopted. Examples of the method include the following methods: (1) a method of melting and kneading a polyolefin resin composition (a composition comprising a copolymerized high density polyethylene and a high density polyethylene, the same applies hereinafter) and a pore-forming material, forming the melted and kneaded material into a sheet, then stretching the formed material as needed, and then extracting the pore-forming material to form pores, and (2) a method of dissolving a polyolefin resin composition and then immersing the solution in a poor solvent for the polyolefins to solidify the polyolefins and at the same time remove the solvent to form pores.

As one example of the method for producing the microporous membrane, a method in which a polyolefin resin composition and a pore-forming material are melted and kneaded to form a sheet shape, and then the pore-forming material is extracted will be described below.

First, the polyolefin resin composition and the above pore-forming material are melted and kneaded. Examples of the melting and kneading method include, but are not limited to, a method in which polyolefin resins, and other additives as needed, are charged into a resin kneading apparatus such as an extruder, a kneader, LABO PLASTOMILL, a kneading roll, or a Banbury mixer so that the pore-forming material is introduced at any ratio for kneading while the resin components are heated and melted.

(Pore-Forming Material)

Examples of the above pore-forming material can include, but are not limited to, plasticizers, inorganic materials, or combinations thereof.

The plasticizer is not particularly limited, but nonvolatile solvents capable of forming uniform solutions at the melting points of the polyolefins or more are preferably used. Specific examples of such nonvolatile solvents include, but are not limited to, hydrocarbons such as liquid paraffins and paraffin waxes; esters such as dioctyl phthalate and dibutyl phthalate; and higher alcohols such as oleyl alcohol and stearyl alcohol. These plasticizers may be recovered by an operation such as distillation after extraction and recycled.

Among the plasticizers, liquid paraffins are preferred because when the polyolefin resins are polyethylene and polypropylene, the liquid paraffins have high compatibility with these, and the interface debonding between the resins and the plasticizer is less likely to occur even if the melted and kneaded material is stretched, and uniform stretching tends to be carried out easily.

The ratio between the polyolefin resin composition and the plasticizer is not particularly limited as long as it is in a range in which these can be uniformly melted and kneaded, and formed into a sheet. For example, the mass fraction of the plasticizer in the composition comprising the polyolefin resin composition and the plasticizer is preferably 20 to 90% by mass, more preferably 30 to 80% by mass. When the mass fraction of the plasticizer is 90% by mass or less, the melt tension during melting and forming tends to be sufficient for formability improvement. On the other hand, when the mass fraction of the plasticizer is 20% by mass or more, the cutting of the polyolefin molecular chains does not occur even when the mixture of the polyolefin resin composition and the plasticizer is stretched at a high magnification, and a uniform and fine pore structure can be easily formed, and the strength is also easily increased.

(Membrane Forming Step)

Next, the melted and kneaded material is formed into a sheet. Examples of the method for producing a sheet-like molded product include, but are not limited to, a method of extruding the melted and kneaded material into a sheet shape through a T die or the like and bringing the extruded material into contact with a heat conductor to cool the extruded material to a temperature sufficiently lower than the crystallization temperatures of the resin components for solidification. Examples of the heat conductor used for cooling and solidification include, but are not limited to, metals, water, air, or plasticizers. Among these, metal rolls are preferably used because the efficiency of heat conduction is high. Sandwiching the extruded kneaded material between metal rolls when bringing the extruded kneaded material into contact with the rolls is more preferred because the efficiency of heat conduction tends to increase further, and at the same time the sheet tends to be oriented to increase membrane strength, and the surface smoothness of the sheet also tends to improve. The die lip gap when the melted and kneaded material is extruded into a sheet shape from the T die is preferably 200 µm or more and 3,000 µm or less, more preferably 500 µm or more and 2,500 µm or less. When the die lip gap is 200 µm or more, gum of die and the like tend to be reduced, and the influence on membrane quality such as streaks and defects tends to be small, and the risk of membrane breaking and the like tends to be reduced in the subsequent stretching step. On the other hand, when the die lip gap is 3,000 µm or less, the cooling speed is fast, and cooling unevenness tends to be able to be prevented, and at the same time the thickness stability of the sheet tends to be able to be maintained.

(Plasticizer Removing Step)

Next, the pore-forming material is removed from the sheet-like molded product to form a microporous membrane. Examples of the method for removing the pore-forming material include, but are not limited to, a method of immersing the sheet-like molded product in an extraction solvent to extract the pore-forming material followed by sufficient drying. The method for extracting the pore-forming material may be either batchwise or continuous. In order to suppress the shrinkage of the microporous membrane, the ends of the sheet-like molded product are preferably restrained during the series of steps of immersion and drying. The amount of the pore-forming material remaining in the microporous membrane is preferably less than 1% by mass based on the mass of the entire microporous membrane.

As the extraction solvent used when the pore-forming material is extracted, those that are poor solvents for the polyolefin resins and good solvents for the pore-forming material and have boiling points lower than the melting points of the polyolefin resins are preferably used. Examples of such extraction solvents include, but are not limited to, hydrocarbons such as n-hexane and cyclohexane; halogenated hydrocarbons such as methylene chloride and 1,1,1-trichloroethane; non-chlorine-based halogenated solvents such as hydrofluoroether and hydrofluorocarbon; alcohols such as ethanol and isopropanol; ethers such as diethyl ether and tetrahydrofuran; and ketones such as acetone and methyl ethyl ketone. These extraction solvents may be recovered by an operation such as distillation and recycled. When an inorganic material is used as the pore-forming material, an aqueous solution of sodium hydroxide, potassium hydroxide, or the like can be used as the extraction solvent.

(Stretching Step)

The above sheet-like molded product or microporous membrane is preferably stretched. The stretching may be performed before the pore-forming material is extracted from the above sheet-like molded product. In addition, the stretching may be performed on the microporous membrane obtained by extracting the pore-forming material from the above sheet-like molded product. Further, the stretching may be performed before and after the pore-forming material is extracted from the above sheet-like molded product.

As the stretching treatment, either uniaxial stretching or biaxial stretching can be preferably used, but biaxial stretching is preferred from the viewpoint of improving the strength and the like of the obtained microporous membrane. When the sheet-like molded product is stretched at high magnifications in two axial directions, the molecules are oriented in the planar direction, and the finally obtained microporous membrane is less likely to tear and has high puncture strength. Examples of the stretching method can include, but are not limited to, methods such as simultaneous biaxial stretching, sequential biaxial stretching, multistage stretching, and multiple stretchings. From the viewpoint of the improvement of puncture strength, the uniformity of stretching, and shutdown properties, simultaneous biaxial stretching is preferred.

Here, the simultaneous biaxial stretching refers to a stretching method in which MD (the machine direction of microporous membrane continuous forming) stretching and TD (the direction traversing the MD of the microporous membrane at an angle of 90°) stretching are simultaneously performed, and the drawing magnifications in the directions may be different. The sequential biaxial stretching refers to a stretching method in which MD stretching and TD stretching are independently performed, and when stretching is performed in the MD or the TD, the microporous membrane is in a nonrestrained state or in a state of being fixed at a constant length in the other direction.

The drawing magnification is preferably in the range of 20 times or more and 100 times or less, more preferably in the range of 25 times or more and 70 times or less, in terms of an area magnification. The drawing magnifications in the axial directions are preferably in the ranges of 4 times or more and 10 times or less in the MD and 4 times or more and 10 times or less in the TD, more preferably in the ranges of 5 times or more and 8 times or less in the MD and 5 times or more and 8 times or less in the TD. When the total area magnification is 20 times or more, sufficient strength tends to be able to be provided to the obtained microporous membrane. On the other hand, when the total area magnification is 100 times or less, membrane breaking in the stretching step is prevented, and high productivity tends to be obtained.

(Heat Setting)

The microporous membrane is preferably subjected to heat treatment for the purpose of heat setting from the viewpoint of suppressing shrinkage. Examples of the method of heat treatment include a stretching operation performed in a predetermined temperature atmosphere and at a predetermined drawing magnification for the purpose of the adjustment of physical properties, and/or a relaxation operation performed in a predetermined temperature atmosphere and at a predetermined relaxation rate for the purpose of stretching stress reduction. The relaxation operation may be performed after the stretching operation is performed. These heat treatments can be performed using a tenter or a roll stretching machine.

In the stretching operation, stretching of 1.1 times or more, more preferably 1.2 times or more, is preferably performed in the MD and/or TD of the membrane from the viewpoint of obtaining a microporous membrane having even higher strength and higher porosity.

The relaxation operation is a reduction operation in the MD and/or TD of the membrane. The relaxation rate is a value obtained by dividing the size of the membrane after the relaxation operation by the size of the membrane before the relaxation operation. When the membrane is relaxed in both the MD and the TD, the relaxation rate is a value obtained by multiplying the MD relaxation rate and the TD relaxation rate. The relaxation rate is preferably 1.0 or less, more preferably 0.97 or less, and further preferably 0.95 or less. The relaxation rate is preferably 0.5 or more from the viewpoint of membrane quality. The relaxation operation may be performed in both directions, the MD and the TD, but may be performed in only one direction, the MD or the TD.

These stretching and relaxation operations after plasticizer extraction are preferably performed in the TD. The temperature in the stretching and relaxation operations is preferably lower than the melting points of the polyolefin resins (hereinafter also referred to as "Tm"), more preferably in the range of 1° C. to 25° C. lower than Tm. The temperature in the stretching and relaxation operations in the above range is preferred from the viewpoint of the balance between heat shrinkage rate reduction and porosity.

(Battery Separator and Battery)

The microporous membrane in the present embodiment is preferably used especially in an application as a battery separator. In other words, a battery separator in the present embodiment comprises the microporous membrane in the present embodiment. In addition, a battery in the present embodiment comprises the microporous membrane in the present embodiment.

EXAMPLES

The present embodiment will be described in more detail below by Examples, but the present embodiment is not limited to only these Examples. In the following Examples and Comparative Examples, parts all means parts by mass.

The methods for testing the characteristics shown in the Examples and the Comparative Examples are as follows.

(1) Membrane Thickness

The membrane thickness was measured by a dial gauge (OZAKI MFG. CO., LTD.: "PEACOCK No. 25"™).

(2) Porosity

A sample 10 cm square was taken, and from its volume and mass, the porosity was calculated using the following formula:

$$\text{porosity (\%)} = (\text{volume (cm}^3) - \text{mass (g)/density of polymer composition})/\text{volume (cm}^3) \times 100$$

(3) Puncture Strength

Using "KES-G5 Handy Compression Tester"™ manufactured by KATO TECH CO., LTD., a puncture test was performed under the conditions of a radius of curvature of the needle tip of 0.5 mm and a puncture speed of 2 mm/sec, and the maximum puncture load (N) was measured.

(4) Air Permeability

The air permeability was measured by a Gurley type air permeability meter in accordance with JIS P-8117.

(5) Polypropylene Content (wt %) in Microporous Membrane

Figure 1:
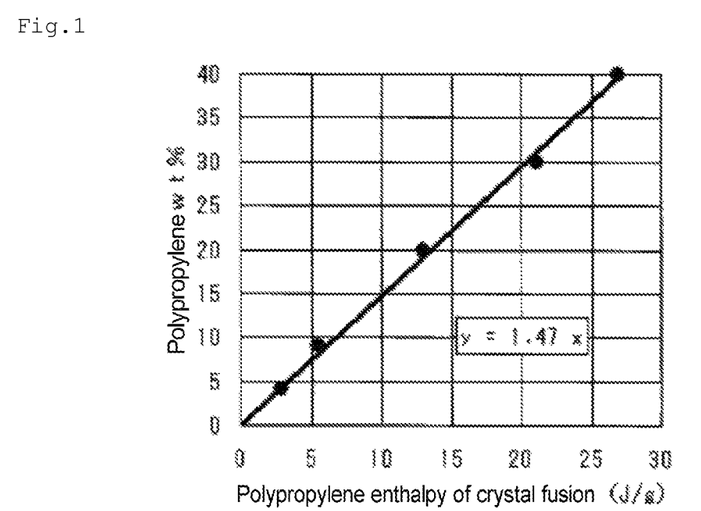
FIG. 1 is a calibration curve showing the relationship of polypropylene content (wt %) to polypropylene enthalpy of crystal fusion in the present invention.

Microporous membranes in which each wt % of polypropylene included in polyolefins was 4, 9, 20, 30, or 40 wt % were prepared, and the enthalpy of crystal fusion (J/g) attributed to polypropylene was measured by a differential scanning calorimeter (DSC). Based on a plot showing the relationship of polypropylene content (wt %) to propylene enthalpy of crystal fusion, and using the least squares method, an approximate straight line passing through the origin was defined as a calibration curve. Using this calibration curve, a polypropylene content (wt %) in a microporous membrane was obtained from a polypropylene enthalpy of crystal fusion obtained by a DSC. An example of the obtained calibration curve is shown in FIG. 1.

The enthalpy of crystal fusion was obtained by the following method. The DSC sample was made by stamping a microporous membrane into circles having a diameter of 5 mm, superimposing the circular microporous membranes to make 3 mg, placing them in an aluminum sample pan having a diameter of 5 mm, and sealing it with a crimping cover. Using a DSC (product name: DSC-60A) manufactured by SHIMADZU CORPORATION, the above DSC sample was heated at 10° C./min from 30 to 200° C. under a nitrogen atmosphere, and then the temperature was maintained at 200° C. for 5 minutes. The DSC sample was further cooled at 10° C./min from 200 to 30° C., then the temperature was maintained at 30° C. for 5 minutes, and the DSC sample was heated at 10° C./min from 30 to 200° C. again. The numerical value measured at this time was taken as a polypropylene enthalpy of crystal fusion.

(6) Comonomer Unit Content (Content of α-Olefin Unit Having 3 or More Carbon Atoms)

In a 13C-NMR spectrum, the mole-converted value of the integral value of signal intensity derived from a comonomer (A) was divided by the sum of (A) and the mole-converted amount of the integral value of signal intensity derived from an ethylene unit (B), and the obtained quotient was multiplied by 100 to obtain a comonomer unit content (mol %). Herein, when polypropylene was contained in a microporous membrane, a value obtained by excluding a comonomer unit content (mol %) corresponding to a polypropylene content (wt %) obtained by the above was taken as the comonomer unit content (mol %) of the microporous membrane.

Note: for example, in a case where propylene is used as the comonomer, when in the following structural model, I1, I1', I2, I3, Iα, Iβ, Iγ, Im, and IM are signal intensities in the 13C-NMR spectrum derived from corresponding carbons respectively, the comonomer unit content is represented by the following formula:

comonomer unit content (mol %)=(A)/[(A)+(B)]×100 wherein (A)=(I1+Im+Iα/2)/3, and (B)=(I1+I2+I3+IM+Iα/2+Iβ+Iγ)/2).

Figure 2:
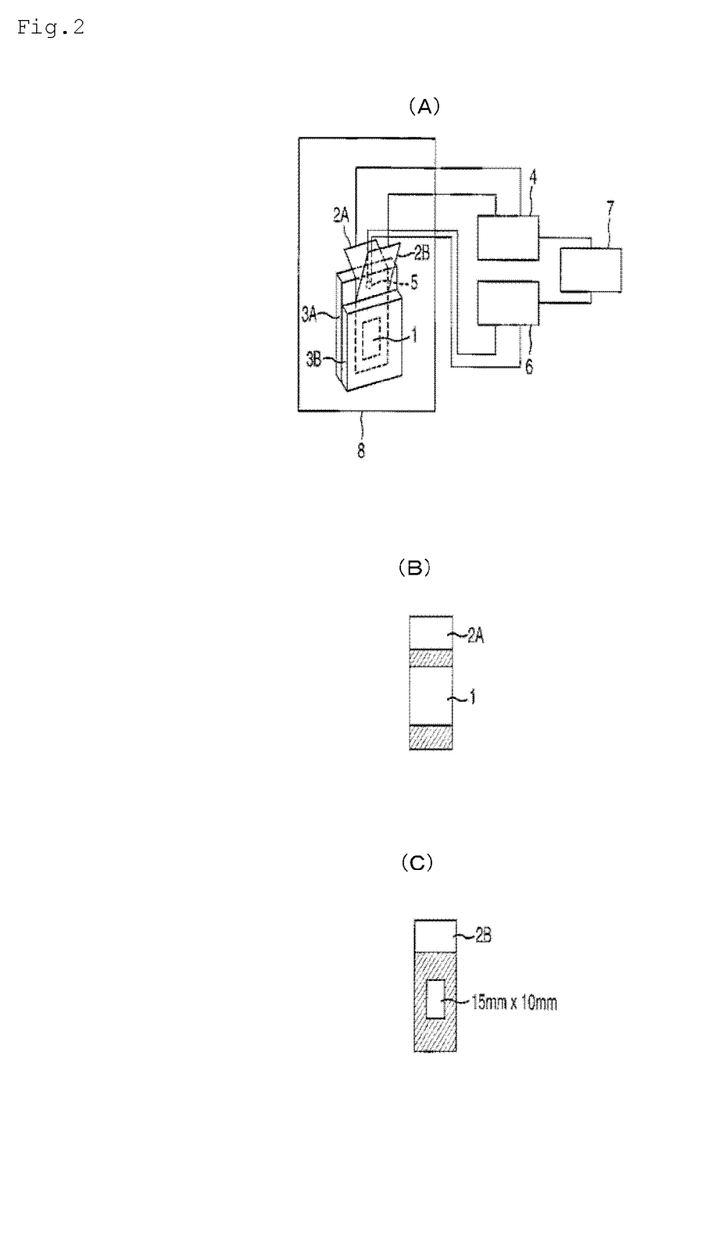
FIG. 2(A) is its schematic diagram.
FIG. 2(B) is a plan view of a nickel foil 2A.
FIG. 2(C) is a plan view of a nickel foil 2B.

Here, the influence of the ends is small and therefore negligible, and when the above formula is arranged using I1, I2, and I3 as Im and Iα, Iβ, and Iγ as 2 Im, the comonomer unit content is represented by the following formula:

comonomer unit content (mol %)=Im/[Im+(IM+5 Im)/2]×100 posed on the nickel foil 2A and fixed to the nickel foil 2A in the longitudinal direction with a "Teflon®" tape (the shaded portions in the figure). The microporous membrane 1 impregnated with a 1 mol/L lithium borofluoride solution (solvents: propylene carbonate/ethylene carbonate/γ-butyrolactone=1/1/2) as an electrolytic solution was used. A "Teflon®" tape (the shaded portion in the figure) was laminated on the nickel foil 2B as shown in FIG. 2(C), and the nickel foil 2B was masked with a 15 mm×10 mm window portion left in the central portion of the foil 2B.

The nickel foil 2A and the nickel foil 2B were superimposed so as to sandwich the microporous membrane 1, and further, from both sides thereof, the two nickel foils were sandwiched between the glass plates 3A and 3B. At this time, the window portion of the foil 2B and the microporous membrane 1 were disposed at opposed positions.

The two glass plates were fixed by being sandwiched by a commercial double clip. The thermocouple 5 was fixed to the glass plate with a "Teflon®" tape.

The temperature and the electrical resistance were continuously measured by such an apparatus. The temperature was raised at a speed of 2° C./min from 25° C. to 200° C., and the electrical resistance value was measured at an alternating current of 1 kHz. The fuse temperature was defined as the temperature when the electrical resistance value of the microporous membrane reached $10^3 \Omega$.

(9) Fuse Response Time

The time during which the electrical resistance value reached $10^3 \Omega$ from $10^2 \Omega$ in the above fuse temperature measurement was defined as fuse response time.

(10) Membrane Breakage (Short) Temperature

The temperature when the electrical resistance value fell below $10^3 \Omega$ after the electrical resistance value reached $10^3 \Omega$ from $10^2 \Omega$ in the above fuse temperature measurement was taken as membrane breakage (short) temperature.

(11) Viscosity Average Molecular Weight (Mv)

The viscosity average molecular weight was measured based on ASTM-D4020. Polyolefin starting materials or a microporous membrane was dissolved in a decalin solution (7) Melt Index (MI)

A melt index measured at a temperature of 190° C. and under a load of 2.16 kg based on JIS K-7210 was taken as MI.

(8) Fuse Temperature

The fuse temperature was measured using the measuring apparatus shown in FIG. 2(A) as a schematic view. As shown in FIG. 2(A), a microporous membrane 1 was disposed between nickel foils 2A and 2B having a thickness of 10 μm, and these were fixed by glass plates 3A and 3B. The nickel foils 2A and 2B were connected to an electrical resistance measuring apparatus 4 (LCR meter "AG-4311"™ manufactured by Ando Electric Co., Ltd.), a thermocouple 5 was connected to a thermometer 6, and a data collector 7 was connected to the electrical resistance measuring apparatus 4 and the thermometer 6. Further, an oven 8 for heating the microporous membrane 1 was installed.

This apparatus will be described in more detail. As shown in FIG. 2(B), the microporous membrane 1 was superimat 135° C., the limiting viscosity [η] was measured, and the viscosity average molecular weight (Mv) was calculated by the following formula:

$$[\eta]=6.77\times10^{-4}\,Mv^{0.67}$$

For polypropylene, Mv was calculated by the following formula:

$$[\eta]=1.10\times10^{-4}\,Mv^{0.80}$$

(12) Dynamic Friction Coefficient

The dynamic friction coefficient was measured three times in the TD direction for a sample size of width 50 mm×measurement direction 200 mm under the conditions of a load of 50 g, a contact area of 10×10=100 mm² (one obtained by winding 20 0.5 mm φ piano wires made of hard stainless steel wire SUS304 closely with each other and so as not to overlap), a contact feed speed of 1 mm/sec, a tension of 6 kPa, a temperature of 23° C., and a humidity of 50% using a KES-SE friction tester manufactured by KATO TECH CO., LTD., and the average was obtained. For the value of the dynamic friction coefficient, the value of the surface to be in contact with a negative electrode during battery making was used.

(13) Pin Removability After Battery Winding (Battery Windability)

Figure 3:
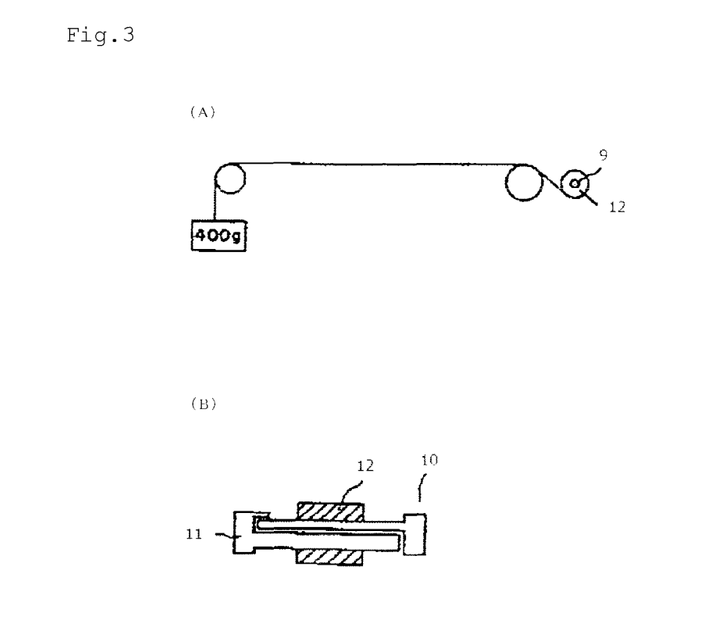
FIGS. 3(A) to 3(B) are diagrams showing a manual winding machine manufactured by KAIDO MANUFACTURING CO., LTD. by which pin removability during battery winding was evaluated.

Using a manual winding machine manufactured by KAIDO MANUFACTURING CO., LTD., a two-ply winding sample (12) having a length of 3 m and a width of 60 mm was wound around a pin (9) under a load of 400 g as in FIG. 3(A) showing the entire configuration of the apparatus. Then, in the winding portion configuration shown in FIG. 3(B), a pin I (10) was removed, and the winding sample (12) was pulled by hand and removed from a pin II (11). From the winding form of the removed sample, the pin removal characteristics were evaluated according to the following criteria:

○; the proportion of samples, in which pin contact portions were displaced by 2 mm or more from their initial positions before pin removal due to being pulled by the pin, was 1/100 or less Δ; the proportion of samples, in which pin contact portions were displaced by 2 mm or more from their initial positions before pin removal due to being pulled by the pin, was 2/100 to 4/100

×; the proportion of samples, in which pin contact portions were displaced by 2 mm or more from their initial positions before pin removal due to being pulled by the pin, was 5/100 or more (14) Fraction Defective (Defects)

100 $m^2$ of each of microporous membranes obtained in the Examples and the Comparative Examples was visually observed, and the number of unmelted polymer gels of 0.3 $mm^2$ or more (defects) per area of 10 $m^2$ was counted. From the above number, the fraction defective (defects) was evaluated according to the following criteria:

○: less than 1 per 10 $m^2$
Δ: 1 or more and less than 3 per 10 $m^2$
x: 3 or more per 10 $m^2$ (15) Molecular Weight Distribution (Mw/Mn) of Microporous Membrane The molecular weight distribution (Mw/Mn) of a microporous membrane was calculated from gel permeation chromatography (GPC) measurement. Measurement was performed at a specimen concentration of 0.05 wt % at 140° C. using model ALC/GPC-150-C-Plus™ manufactured by Waters for the apparatus, using two GMH6-HT™ 30-cm columns and two GMH6-HTL™ 30-cm columns manufactured by Tosoh Corporation connected in series, and using orthodichlorobenzene as a mobile phase solvent. A calibration curve was made using as a standard substance commercial monodisperse polystyrene whose molecular weight was known, and the obtained polystyrene-converted molecular weight distribution data of each specimen was multiplied by 0.43 (Q factor of polyethylene/Q factor of polystyrene=17.7/41.3) to obtain polyethylene-converted molecular weight distribution data. From this, the weight average molecular weight (Mw) and number average molecular weight (Mn) of each specimen were calculated to obtain molecular weight distribution (Mw/Mn).

(16) High Speed Tensile Strength

The high speed tensile strength was measured for a TD sample (shape; width 10 mm×length 60 mm) using a high speed impact tester, model HITS-T10 ™, manufactured by SHIMADZU CORPORATION. At this time, for the sample, the distance between chucks was 20 mm, and the both ends (20 mm each) of the sample were fixed by film grips. The measurement was performed at a load speed of 2 m/s.

Example 1

20 Parts of a copolymerized high density polyethylene having an MI of 0.8 (Mv 150,000), comprising propylene as a comonomer, and having a propylene unit content of 0.6 mol % and a density of 0.95 (hereinafter also referred to as "PE1"), 18 parts of a high density homopolyethylene having an My of 250,000, a comonomer unit content of 0.0%, and a density of 0.95 (hereinafter also referred to as "PE10"), 2 parts of homopolypropylene having an My of 400,000, a comonomer unit content of 0.0%, and a density of 0.91 (hereinafter also referred to as "PP"), and tetrakis-[methylene-3-(3',5'-di-t-butyl-4'-hydroxyphenyl) propionate]methane as an antioxidant in an amount of 0.3 parts based on the composition were mixed and charged into a twin-screw extruder through a feeder. Further, 60 parts of a liquid paraffin (P-350 ™ manufactured by MATSUMURA OIL Co., Ltd.) was injected into the extruder through a side feed, and the mixture was kneaded under the condition of 200° C., extruded from a T die installed at the extruder tip, and then immediately cooled and solidified by a cast roll cooled to 25° C., to form a gel-like sheet having a thickness of 1500 μm. This gel-like sheet was stretched 7×7 times at 120° C. by a simultaneous biaxial stretching machine, and then this stretched film was led to a methylene chloride vessel and sufficiently immersed in methylene chloride to extract and remove the liquid paraffin. Then, the methylene chloride was removed by drying to obtain a microporous membrane. The obtained microporous membrane was led to a TD tenter in order to be subjected to heat setting (also referred to as "HS"), subjected to HS at a heat setting temperature of 125° C. and a drawing magnification of 1.6 times, and then subjected to a 0.85-times relaxation operation (that is, the HS relaxation rate was 0.85 times) to obtain a microporous membrane. The results of evaluating various characteristics for the obtained microporous membrane are shown in Table 1.

Example 2

The same membrane formation as Example 1 was performed except that 12 parts of a copolymerized high density polyethylene having an MI of 1.0 (Mv 120,000), comprising propylene as a comonomer, and having a propylene unit content of 0.8 mol % and a density of 0.94 (hereinafter also referred to as "PE2"), 26 parts of PE10, and 2 parts of PP were used as polyolefin starting materials. The physical properties of the obtained microporous membrane are shown in Table 1.

Example 3

The same membrane formation as Example 1 was performed except that 12 parts of PE1, 26 parts of a high density homopolyethylene having an My of 400,000, a comonomer unit content of 0.0%, and a density of 0.95 (hereinafter also referred to as "PE11"), and 2 parts of PP were used as polyolefin starting materials. The physical properties of the obtained microporous membrane are shown in Table 1.

Example 4

The same membrane formation as Example 1 was performed except that 16 parts of a copolymerized high density polyethylene having an MI of 2.0 (Mv 100,000), comprising propylene as a comonomer, and having a propylene unit content of 0.4 mol % and a density of 0.95 (hereinafter also referred to as "PE3"), 12 parts of PE10, 8 parts of PE11, and 4 parts of PP were used as polyolefin starting materials. The physical properties of the obtained microporous membrane are shown in Table 1.

Example 5

The same membrane formation as Example 1 was performed except that 11.2 parts of PE1, 26.8 parts of PE10, and 2 parts of PP were used as polyolefin starting materials. The physical properties of the obtained microporous membrane are shown in Table 1.

Example 6

The same membrane formation as Example 1 was performed except that 12 parts of PE1 and 28 parts of PE10 were used as polyethylene starting materials, and PP was not used. The physical properties of the obtained microporous membrane are shown in Table 1.

Example 7

The same membrane formation as Example 1 was performed except that 28 parts of PE2, 10 parts of PE11, and 2 parts of PP were used as polyolefin starting materials. The physical properties of the obtained microporous membrane are shown in Table 1.

Example 8

The same membrane formation as Example 1 was performed except that 12 parts of PE3, 8 parts of high density homopolyethylene having an Mv of 150,000, a comonomer unit content of 0.0%, and a density of 0.97 (hereinafter also referred to as "PE9"), and 20 parts of PE10 were used as polyethylene starting materials, and PP was not used. The physical properties of the obtained microporous membrane are shown in Table 1.

Example 9

The same membrane formation as Example 1 was performed except that 12 parts of PE2, 20 parts of PE10, and 8 parts of PP were used as polyolefin starting materials. The physical properties of the obtained microporous membrane are shown in Table 1.

Example 10

The same membrane formation as Example 1 was performed except that 30 parts of PE1, 8 parts of PE11, and 2 parts of PP were used as polyolefin starting materials. The physical properties of the obtained microporous membrane are shown in Table 1.

Example 11

The same membrane formation as Example 1 was performed except that 12 parts of a copolymerized high density polyethylene having an MI of 0.8 (Mv 120,000), comprising propylene as a comonomer, and having a propylene unit content of 1.3 mol % and a density of 0.94 (hereinafter also referred to as "PE4"), 18 parts of PE10, 8 parts of PE11, and 2 parts of PP were used as polyolefin starting materials. The physical properties of the obtained microporous membrane are shown in Table 1.

Example 12

The same membrane formation as Example 1 was performed except that 18 parts of a copolymerized high density polyethylene having an MI of 2.5 (Mv 90,000), comprising butene as a comonomer, and having a butene unit content of 0.6 mol % and a density of 0.94 (hereinafter also referred to as "PE5"), 10 parts of PE9, 10 parts of PE11, and 2 parts of PP were used as polyolefin starting materials. The physical properties of the obtained microporous membrane are shown in Table 1.

Example 13

The same membrane formation as Example 1 was performed except that 18 parts of PE5, 10 parts of PE9, 10 parts of a high density homopolyethylene having an Mv of 700,000, a comonomer unit content of 0.0%, and a density of 0.95 (hereinafter also referred to as "PE12"), and 2 parts of PP were used as polyolefin starting materials. The physical properties of the obtained microporous membrane are shown in Table 1.

Example 14

The same membrane formation as Example 1 was performed except that 20 parts of a copolymerized high density polyethylene having an MI of 5.0 (Mv 70,000), comprising butene as a comonomer, and having a butene unit content of 0.5 mol % and a density of 0.95 (hereinafter also referred to as "PE6"), 7.2 parts of PE10, 10 parts of PE12, and 2.8 parts of PP were used as polyolefin starting materials. The physical properties of the obtained microporous membrane are shown in Table 1.

Comparative Example 1

The same membrane formation as Example 1 was performed except that 12 parts of PE1, 14 parts of PE10, 12 parts of PE12, and 2 parts of PP were used as polyolefin starting materials. The physical properties of the obtained microporous membrane are shown in Table 2.

Comparative Example 2

The same membrane formation as Example 1 was performed except that 20 parts of PE1, 18 parts of PE12, and 2 parts of PP were used as polyolefin starting materials. The physical properties of the obtained microporous membrane are shown in Table 2.

Comparative Example 3

The same membrane formation as Example 1 was performed except that 12 parts of PE3, 16 parts of PE10, 8 parts of ultrahigh molecular weight polyethylene having an Mv of 2,000,000, a comonomer unit content of 0.0%, and a density of 0.95 (hereinafter also referred to as "PE13"), and 4 parts of PP were used as polyolefin starting materials. The physical properties of the obtained microporous membrane are shown in Table 2.

Comparative Example 4

The same membrane formation as Example 1 was performed except that 20 parts of a copolymerized low density polyethylene having an MI of 0.3 (Mv 170,000), comprising butene as a comonomer, and having a butene unit content of 1.8 mol % and a density of 0.92 (hereinafter also referred to as "PE8"), 18 parts of PE10, and 2 parts of PP were used as polyolefin starting materials. The physical properties of the obtained microporous membrane are shown in Table 2.

Comparative Example 5

The same membrane formation as Example 1 was performed except that 8 parts of PE9 and 32 parts of PE10 were used as polyethylene starting materials, and PP was not used. The physical properties of the obtained microporous membrane are shown in Table 2.

Comparative Example 6

The same membrane formation as Example 1 was performed except that 20 parts of a copolymerized high density polyethylene having an MI of 0.02 (Mv 400,000), comprising propylene as a comonomer, and having a propylene unit content of 1.6 mol % and a density of 0.93 (hereinafter also referred to as "PE7") and 20 parts of PE10 were used as polyolefin starting materials, and PP was not used. The physical properties of the obtained microporous membrane are shown in Table 2.

TABLE 1

| | | | Example 1 | Example 2 | Example 3 | Example 4 | Example 5 | Example 6 | Example 7 | Example 8 |
|---|---|---|---|---|---|---|---|---|---|---|
| Compositions | PE1 | MI0.8 propylene unit content 0.6 mol % | 50 | | 45 | | 28 | 30 | | |
| | PE2 | MI1.0 propylene unit content 0.8 mol % | | 30 | | | | | 70 | |
| | PE3 | MI2.0 propylene unit content 0.4 mol % | | | | 40 | | | | 30 |
| | PE4 | MI0.8 propylene unit content 1.3 mol % | | | | | | | | |
| | PE5 | MI2.5 butene unit content 0.6 mol % | | | | | | | | |
| | PE6 | MI5.0 butene unit content 0.5 mol % | | | | | | | | |
| | PE7 | MI0.02 propylene unit content 1.6 mol % | | | | | | | | |
| | PE8 | MI0.3 propylene unit content 1.8 mol % | | | | | | | | |
| | PE9 | Mv150,000 | | | | | | | | 20 |
| | PE10 | Mv250,000 | 45 | 65 | | 30 | 67 | 70 | | 50 |
| | PE11 | Mv400,000 | | | 50 | 20 | | | 25 | |
| | PE12 | Mv700,000 | | | | | | | | |
| | PE13 | Mv2000,000 | | | | | | | | |
| | PP | Mv400,000 | 5 | 5 | 5 | 10 | 5 | | 5 | |
| Membrane characteristics | | Viscosity average molecular weight (ten thousands) of microporous membrane | 22 | 22 | 29 | 23 | 22 | 21 | 20 | 18 |
| | | Molecular weight distribution (Mw/Mn) of microporous membrane | 6.7 | 6.8 | 7.3 | 7.0 | 6.9 | 6.9 | 7.4 | 6.9 |
| | | Content (mol %) of α-olefin unit having 3 or more carbon atoms in microporous membrane | 0.3 | 0.24 | 0.27 | 0.16 | 0.12 | 0.18 | 0.56 | 0.12 |
| | | Membrane thickness (μm) | 16 | 15 | 16 | 16 | 16 | 17 | 17 | 15 |
| | | Porosity (%) | 44 | 42 | 42 | 41 | 42 | 42 | 43 | 41 |
| | | Air permeability (seconds) | 200 | 280 | 200 | 210 | 220 | 220 | 300 | 200 |
| | | Puncture strength (N) | 3 | 3 | 3.6 | 3.2 | 3.2 | 3 | 2 | 2.2 |
| | | High speed tensile strength (MPa) | 70 | 75 | 80 | 70 | 72 | 68 | 65 | 68 |
| | | Fuse temperature (° C.) | 135 | 136 | 136 | 136 | 137 | 137 | 134 | 137 |
| | | Membrane breakage temperature (° C.) | 186 | 181 | 195 | 185 | 185 | 167 | 183 | 164 |
| | | Dynamic friction coefficient | 0.11 | 0.15 | 0.13 | 0.15 | 0.2 | 0.18 | 0.2 | 0.12 |
| | | Battery windability | ○ | ○ | ○ | ○ | Δ | ○ | Δ | ○ |
| | | Fuse response time (seconds) | 8 | 9 | 10 | 8 | 9 | 9 | 8 | 8 |
| | | Fraction defective (defects) | ○ | ○ | Δ | Δ | ○ | ○ | Δ | ○ |

TABLE 1-continued

|  |  |  | Example 9 | Example 10 | Example 11 | Example 12 | Example 13 | Example 14 |
|---|---|---|---|---|---|---|---|---|
| Compositions | PE1 | MI0.8 propylene unit content 0.6 mol % |  | 75 |  |  |  |  |
|  | PE2 | MI1.0 propylene unit content 0.8 mol % | 30 |  |  |  |  |  |
|  | PE3 | MI2.0 propylene unit content 0.4 mol % |  |  |  |  |  |  |
|  | PE4 | MI0.8 propylene unit content 1.3 mol % |  |  | 30 |  |  |  |
|  | PE5 | MI2.5 butene unit content 0.6 mol % |  |  |  | 45 | 45 |  |
|  | PE6 | MI5.0 butene unit content 0.5 mol % |  |  |  |  |  | 50 |
|  | PE7 | MI0.02 propylene unit content 1.6 mol % |  |  |  |  |  |  |
|  | PE8 | MI0.3 propylene unit content 1.8 mol % |  |  |  |  |  |  |
|  | PE9 | Mv150,000 |  |  |  | 25 | 25 |  |
|  | PE10 | Mv250,000 | 50 |  | 45 |  |  | 18 |
|  | PE11 | Mv400,000 |  | 20 | 20 | 25 |  |  |
|  | PE12 | Mv700,000 |  |  |  |  | 25 | 25 |
|  | PE13 | Mv2000,000 |  |  |  |  |  |  |
|  | PP | Mv400,000 | 20 | 5 | 5 | 5 | 5 | 7 |
| Membrane characteristics | Viscosity average molecular weight (ten thousands) of microporous membrane |  | 23 | 20 | 23 | 20 | 27 | 28 |
|  | Molecular weight distribution (Mw/Mn) of microporous membrane |  | 6.7 | 7.2 | 7.1 | 6.9 | 7.8 | 7.9 |
|  | Content (mol %) of α-olefin unit having 3 or more carbon atoms in microporous membrane |  | 0.24 | 0.45 | 0.36 | 0.18 | 0.27 | 0.25 |
|  | Membrane thickness (μm) |  | 15 | 16 | 15 | 15 | 14 | 14 |
|  | Porosity (%) |  | 42 | 43 | 42 | 43 | 41 | 43 |
|  | Air permeability (seconds) |  | 260 | 200 | 300 | 220 | 200 | 160 |
|  | Puncture strength (N) |  | 3.2 | 3 | 2.3 | 3.3 | 2.8 | 3.1 |
|  | High speed tensile strength (MPa) |  | 75 | 70 | 68 | 75 | 72 | 73 |
|  | Fuse temperature (° C.) |  | 136 | 134 | 135 | 132 | 132 | 134 |
|  | Membrane breakage temperature (° C.) |  | 185 | 182 | 180 | 174 | 186 | 200< |
|  | Dynamic friction coefficient |  | 0.18 | 0.1 | 0.2 | 0.2 | 0.2 | 0.18 |
|  | Battery windability |  | ○ | ○ | Δ | Δ | Δ | ○ |
|  | Fuse response time (seconds) |  | 9 | 7 | 12 | 7 | 8 | 7 |
|  | Fraction defective (defects) |  | ○ | Δ | Δ | ○ | Δ | Δ |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Compositions | PE1 | MI0.8 propylene unit content 0.6 mol % | 30 | 50 | | | | |
| | PE2 | MI1.0 propylene unit content 0.8 mol % | | | | | | |
| | PE3 | MI2.0 propylene unit content 0.4 mol % | | | 30 | | | |
| | PE4 | MI0.8 propylene unit content 1.3 mol % | | | | | | |
| | PE5 | MI2.5 butene unit content 0.6 mol % | | | | | | |
| | PE6 | MI5.0 butene unit content 0.5 mol % | | | | | | |
| | PE7 | MI0.02 propylene unit content 1.6 mol % | | | | | | 50 |
| | PE8 | MI0.3 propylene unit content 1.8 mol % | | | | 50 | | |
| | PE9 | Mv150,000 | | | | | 20 | |
| | PE10 | Mv250,000 | 35 | | 40 | 45 | 80 | 50 |
| | PE11 | Mv400,000 | | | | | | |
| | PE12 | Mv700,000 | 30 | 45 | | | | |
| | PE13 | Mv2000,000 | | | 20 | | | |
| | PP | Mv400,000 | 5 | 5 | 10 | 5 | | |
| Membrane characteristics | | Viscosity average molecular weight (ten thousands) of microporous membrane | 36 | 39 | 55 | 21 | 22 | 33 |
| | | Molecular weight distribution (Mw/Mn) of microporous membrane | 8.1 | 8.2 | 9.3 | 7.0 | 6.8 | 6.9 |
| | | Content (mol %) of α-olefin unit having 3 or more carbon atoms in microporous membrane | 0.18 | 0.3 | 0.12 | 0.9 | 0 | 0.8 |
| | | Membrane thickness (μm) | 15 | 17 | 16 | 15 | 16 | 16 |
| | | Porosity (%) | 38 | 40 | 41 | 40 | 40 | 40 |
| | | Air permeability (seconds) | 230 | 340 | 410 | 450 | 400 | 350 |
| | | Puncture strength (N) | 4 | 4.5 | 5 | 3 | 3.2 | 4 |
| | | High speed tensile strength (MPa) | 72 | 75 | 78 | 55 | 58 | 70 |
| | | Fuse temperature (° C.) | 137 | 137 | 139 | 135 | 138 | 135 |
| | | Membrane breakage temperature (° C.) | 200< | 200< | 200< | 142 | 140 | 140 |
| | | Dynamic friction coefficient | 0.25 | 0.2 | 0.25 | 0.45 | 0.35 | 0.28 |
| | | Battery windability | x | Δ | x | x | x | x |
| | | Fuse response time (seconds) | 13 | 18 | 20 | 25 | 28 | 25 |
| | | Fraction defective (defects) | x | x | x | ○ | ○ | ○ |

This application claims the priority based on Japanese Patent Application No. 2015-140389 filed on Jul. 14, 2015, the contents of which are incorporated herein by reference.

INDUSTRIAL APPLICABILITY

The microporous membrane of the present invention can be preferably used in the fields of microfiltration membranes, battery separators, capacitor separators, fuel cell materials, and the like.

REFERENCE SIGNS LIST 1 microporous membrane
2A, 2B nickel foil
3A, 3B glass plate
4 electrical resistance measuring apparatus
5 thermocouple
6 thermometer
7 data collector
8 oven
9 pin
10 pin I
11 pin II
12 winding sample

The invention claimed is:

1. A microporous membrane comprising a copolymerized high density polyethylene and a high density polyethylene,
wherein a content of an α-olefin unit having 3 or more carbon atoms in the microporous membrane is 0.12 mol % or more and 0.56 mol % or less,
wherein a viscosity average molecular weight of the microporous membrane is 180,000 or more and less than 300,000,
wherein the copolymerized high density polyethylene has a melt index of 0.8 to 5, and a content of the α-olefin unit having 3 or more carbon atoms in the copolymerized high density polyethylene is 0.4 to 0.8 mol %, and
wherein the high density polyethylene has a viscosity average molecular weight of 150,000 or more and less than 500,000.

2. The microporous membrane according to claim 1, wherein a molecular weight distribution Mw/Mn of the microporous membrane is 2 or more and 8 or less.

3. The microporous membrane according to claim 1, wherein the microporous membrane does not comprise a high density polyethylene having a viscosity average molecular weight of 500,000 or more.

4. The microporous membrane according to claim 1, further comprising polypropylene.

5. The microporous membrane according to claim 1, wherein a dynamic friction coefficient of the microporous membrane is less than 0.2.

6. A battery separator comprising the microporous membrane according to claim 1.

7. A battery comprising the battery separator according to claim 6.

8. The microporous membrane according to claim 1, wherein a fuse response time is 10 seconds or less.

9. The microporous membrane according to claim 8, wherein, in a battery windability test, a proportion of samples, in which pin contact portions are displaced by 2 mm or more from an initial position before pin removal due to being pulled by the pin, is 1/100 or less.

10. The microporous membrane according to claim 1, wherein the viscosity average molecular weight of the microporous membrane is ≤290,000.

11. The microporous membrane according to claim 10, wherein a molecular weight distribution Mw/Mn of the microporous membrane is 2 or more and 8 or less.

12. The microporous membrane according to claim 10, wherein the microporous membrane does not comprise a high density polyethylene having a viscosity average molecular weight of 500,000 or more.

13. The microporous membrane according to claim 10, further comprising polypropylene.

14. The microporous membrane according to claim 10, wherein a dynamic friction coefficient of the microporous membrane is less than 0.2.

15. The microporous membrane according to claim 10, wherein a fuse response time is 10 seconds or less.

16. The microporous membrane according to claim 15, wherein, in a battery windability test, a proportion of samples, in which pin contact portions are displaced by 2 mm or more from an initial position before pin removal due to being pulled by the pin, is 1/100 or less.

17. A battery separator comprising the microporous membrane according to claim 10.

18. A battery comprising the battery separator according to claim 17.

* * * * *